(12) United States Patent
Liebenberg et al.

(10) Patent No.: US 9,285,078 B2
(45) Date of Patent: Mar. 15, 2016

(54) PRESSURE VESSEL

(75) Inventors: Adrienne Liebenberg, London (GB); Simone Trautz, Munich (DE)

(73) Assignee: Linde Aktiengesellschaft, Munich (DE)

( * ) Notice: Subject to any disclaimer, the term of this patent is extended or adjusted under 35 U.S.C. 154(b) by 1006 days.

(21) Appl. No.: 12/969,762

(22) Filed: Dec. 16, 2010

(65) Prior Publication Data

US 2011/0309076 A1 Dec. 22, 2011

(30) Foreign Application Priority Data

Dec. 21, 2009 (GB) .................................. 0922355.3

(51) Int. Cl.
*G01L 19/14* (2006.01)
*F17C 13/02* (2006.01)
(Continued)

(52) U.S. Cl.
CPC .................. *F17C 13/025* (2013.01); *F17C 1/00* (2013.01); *F17C 13/00* (2013.01); *F17C 13/026* (2013.01); *F17C 2201/0109* (2013.01); *F17C 2201/032* (2013.01); *F17C 2201/058* (2013.01); *F17C 2203/0619* (2013.01); *F17C 2203/0639* (2013.01); *F17C 2203/0646* (2013.01); *F17C 2203/0656* (2013.01); *F17C 2205/0126* (2013.01); *F17C 2205/0165* (2013.01); *F17C 2205/0308* (2013.01); *F17C 2205/0329* (2013.01); *F17C 2205/0338* (2013.01); *F17C 2209/221* (2013.01); *F17C 2223/0123* (2013.01); *F17C 2223/0153* (2013.01); *F17C 2223/036* (2013.01); *F17C 2250/032* (2013.01); *F17C 2250/043* (2013.01); *F17C 2250/0408* (2013.01); *F17C 2250/0421* (2013.01); *F17C 2250/0439* (2013.01); *F17C 2250/0491* (2013.01); *F17C 2250/0495* (2013.01); *F17C 2250/075* (2013.01); *F17C 2250/077* (2013.01);
(Continued)

(58) Field of Classification Search
CPC .. B65D 51/16; B60C 23/0408; B60C 23/061; G01L 27/00; F17C 13/00; F17C 13/025
USPC ............ 702/43, 47, 50, 98, 99, 55, 250, 138; 220/203.01
See application file for complete search history.

(56) References Cited

U.S. PATENT DOCUMENTS 5,484,079 A * 1/1996 Carter et al. .................. 220/589
5,542,287 A 8/1996 Powers
5,616,838 A 4/1997 Preston et al.
(Continued)

FOREIGN PATENT DOCUMENTS

CN 200955964 Y 10/2007
CN 201032048 3/2008
(Continued)

*Primary Examiner* — Paul D Lee
(74) *Attorney, Agent, or Firm* — Joshua L. Cohen

(57) ABSTRACT

A gas cylinder for the storage of compressed gas includes a shut-off valve in engagement with a mouth of the cylinder; an external pressure sensor device for sensing pressure in the cylinder, the pressure sensor device being in continuous communication with the interior of the cylinder; a temperature sensor device for sensing temperature of the gas in the cylinder, the temperature sensor device being in thermal communication with the interior of the cylinder; a programmable computing device for calculating information from the temperature and pressure signals concerning the amount of contents in the cylinder; and a display screen operatively associated with the programmable computing device for displaying said information.

8 Claims, 4 Drawing Sheets

(51) Int. Cl.
*F17C 1/00* (2006.01)
*F17C 13/00* (2006.01)

(52) U.S. Cl.
CPC ...... *F17C 2260/026* (2013.01); *F17C 2265/04* (2013.01); *F17C 2270/0745* (2013.01); *G01L 19/147* (2013.01)

(56) References Cited

U.S. PATENT DOCUMENTS

| | | | |
|---|---|---|---|
| 5,695,168 A * | 12/1997 | Williams | 251/149.4 |
| 5,709,252 A * | 1/1998 | Princiotta et al. | 141/18 |
| 5,806,705 A * | 9/1998 | Herald et al. | 220/350 |
| 5,919,362 A * | 7/1999 | Barnes et al. | 210/232 |
| 5,992,700 A * | 11/1999 | McGlothlin et al. | 222/187 |
| 6,009,900 A * | 1/2000 | Elgert et al. | 137/557 |
| 6,134,805 A | 10/2000 | Chowdhury et al. | |
| 6,190,481 B1 * | 2/2001 | Iida et al. | 156/175 |
| 6,386,384 B1 | 5/2002 | Chohfi et al. | |
| 6,397,656 B1 * | 6/2002 | Yamaguchi et al. | 73/1.82 |
| 6,494,343 B2 * | 12/2002 | McManus et al. | 222/55 |
| 6,619,336 B2 * | 9/2003 | Cohen et al. | 141/83 |
| 6,643,951 B1 | 11/2003 | Chowdhury et al. | |
| 6,978,678 B2 | 12/2005 | Lohmeier et al. | |
| 7,104,124 B2 | 9/2006 | Stabile et al. | |
| 7,255,245 B2 * | 8/2007 | Oliveira et al. | 220/586 |
| RE41,142 E * | 2/2010 | Blair et al. | 220/581 |
| 7,699,188 B2 * | 4/2010 | Oliveira et al. | 220/586 |
| 7,966,879 B2 * | 6/2011 | Dietz et al. | 73/313 |
| 8,181,518 B1 * | 5/2012 | Donehue | 73/322.5 |
| 8,231,028 B2 * | 7/2012 | Matsuoka et al. | 220/582 |
| 2003/0158698 A1 | 8/2003 | Glazerbrook | |
| 2004/0065371 A1 * | 4/2004 | Koschany et al. | 137/613 |
| 2004/0206762 A1 * | 10/2004 | Iida et al. | 220/581 |
| 2006/0131350 A1 * | 6/2006 | Schechter et al. | 222/645 |
| 2007/0170110 A1 * | 7/2007 | Onoue et al. | 210/444 |
| 2008/0178877 A1 * | 7/2008 | Gurnee et al. | 128/202.12 |
| 2008/0185003 A1 * | 8/2008 | Gurnee et al. | 128/205.26 |
| 2009/0040049 A1 | 2/2009 | Delecourt et al. | |
| 2009/0145924 A1 * | 6/2009 | Fiedler | 222/95 |
| 2009/0159018 A1 * | 6/2009 | Mehendale et al. | 122/451 R |
| 2009/0223217 A1 * | 9/2009 | Segawa | 60/532 |
| 2010/0139392 A1 * | 6/2010 | Kumar et al. | 73/290 R |
| 2010/0180995 A1 * | 7/2010 | Teratani et al. | 152/157 |
| 2010/0253529 A1 | 10/2010 | Umayahara | |
| 2011/0088465 A1 * | 4/2011 | Niedzballa | 73/295 |

FOREIGN PATENT DOCUMENTS

| | | | | |
|---|---|---|---|---|
| DE | 101 21 444 A1 | 11/2002 | | |
| EP | 1 666 779 A2 | 6/2006 | | |
| JP | 9273972 A | 10/1997 | | |
| WO | WO 99/40553 | 8/1999 | | |
| WO | WO/99/40553 | * 12/1999 | | F17C 1/00 |

* cited by examiner

PRESSURE VESSEL

FIELD OF THE INVENTION

This invention relates to a pressure vessel for storing a compressed gas.

The term "gas" as used herein includes within its scope a gas mixture. The gas may be a permanent gas, in which case it can be stored in a pressure vessel entirely in gaseous state, or a non-permanent gas, in which case it may exist under pressure in the storage vessel as a liquid phase in equilibrium with a gaseous phase according to the storage pressure.

BACKGROUND OF THE INVENTION

Pressure vessels for storing compressed gases are of course very well known and are commonly referred to as "gas cylinders" because they conventionally, but not necessarily, have a cylindrical shape. A gas cylinder is typically able to store gas at a pressure of up to 200 bar or 300 bar. A gas cylinder is conventionally formed as a one-piece vessel, symmetrical about a longitudinal axis, from a suitable steel. The walls of the vessel have a suitable thickness to be able to withstand cycling of pressure from atmospheric pressure to a maximum storage pressure, which as stated above may be as high as 300 bar. The cylinder has an axial opening in which is fitted a valve, typically having a brass body with external screw threads that engage complementary screw threads in the mouth of the cylinder. There are various different kinds of cylinder valve, but all kinds are able to be opened to permit the controlled discharge of gas from the cylinder and also, when the cylinder is empty, to enable it to be refilled. Some cylinder valves have an integral pressure regulator to enable the user to set the pressure at which gas is delivered. Alternatively the cylinder valve may have a port in which a separate pressure regulator may be docked. The pressure regulator may include a pressure gauge to indicate the delivery pressure to a user. Such a pressure gauge is not in continuous communication with the interior of the cylinder.

The traditional steel gas cylinder is heavy and can be awkward to handle. Lighter weight alternatives are known and are increasingly being used, particularly for the storage of medical gases. A lightweight gas cylinder comprises an inner vessel, sometimes known as a liner, which is reinforced with suitable fibrous material, for example, carbon fibre, and which is encased in an outer plastics shell. The inner vessel is typically made of steel, but because of the fibre reinforcement, has a smaller wall thickness than the traditional steel gas cylinder. The inner vessel is typically formed in two pieces which are welded together.

It is a feature of both the traditional steel gas cylinder and its lightweight alternative, that when not in use, there is no simple way of telling how full or how empty it is, the mass of the gas in even a full cylinder being small or negligible in comparison with the mass of the cylinder itself.

SUMMARY OF THE INVENTION

According to the present invention there is provided a pressure vessel apparatus for the storage of compressed gas, comprising:
(a) a pressure vessel for containing the compressed gas;
(b) a shut-off valve in engagement with the mouth of the pressure vessel;
(c) an external pressure sensor device for sensing the pressure in the vessel, the pressure sensor device being in continuous communication with the interior of the pressure vessel and being adapted to generate a first signal which is a function of the sensed pressure in the pressure vessel;
(d) a temperature sensor device for sensing the temperature of the gas in the vessel, the temperature sensor device being in thermal communication with the interior of the pressure vessel and being adapted to generate a second signal which is a function of the sensed temperature of the gas;
(e) a programmable computing device for calculating information concerning the amount of contents in the pressure vessel from the said first and second signals;
(f) a display screen operatively associated with the computing device for displaying said information.

The apparatus according to the invention is thus on simple inspection of the display screen able to impart to the viewer information about the amount of contents present in the vessel. In the example of a permanent gas, the computing device may be programmed to calculate the mass of gas in the cylinder from the real gas equation. This calculated mass may be compared with the mass of gas in the pressure vessel when full, and a pictorial, graphical or digital display of the information may be made, for example as a position on a full to empty scale.

If the gas is not permanent, and a liquid phase is present in the pressure vessel, the apparatus according to the invention may additionally comprise a level detector for detecting the level of liquid in the pressure vessel, the level detector being adapted to generate a signal which is a function of the sensed level of the liquid in the pressure vessel and to transmit the signal to the programmable computing device.

The pressure vessel may be a lightweight vessel comprising an inner fibre-reinforced or fibre-wrapped liner and an outer plastics shell encasing the liner. The pressure vessel may, however, be a conventional steel or aluminium gas cylinder or be made of a seamless composite material.

The display screen, in a lightweight vessel, is preferably set back within the plastics shell. In one embodiment, the shell has a pair of vertical integral handles and the screen has a position under a chosen one of the handles such that it is protected by the chosen handle from impacts from above. In another embodiment, the display screen is also set back within a recess within the outer plastic shell.

BRIEF DESCRIPTION OF THE DRAWINGS

A pressure vessel apparatus according to the invention will now be described by way of example with reference to the accompanying drawings, in which.

The drawings are not to scale.

DETAILED DESCRIPTION

Figure 1:
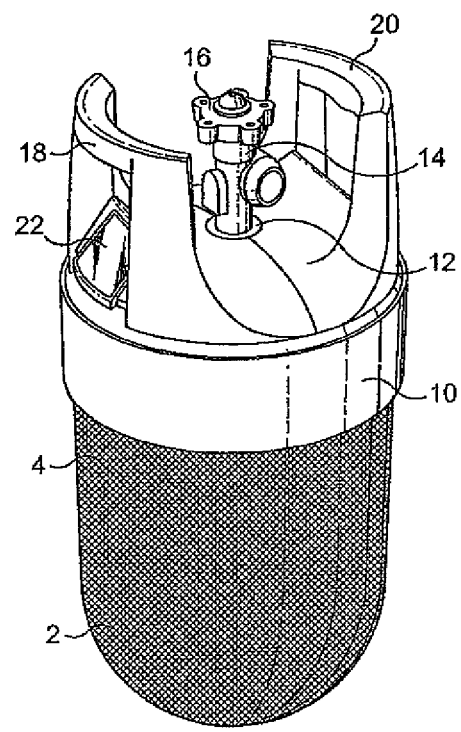
FIG. 1 is a schematic, partially exploded, perspective view of a pressure vessel according to the invention.
Figure 1:
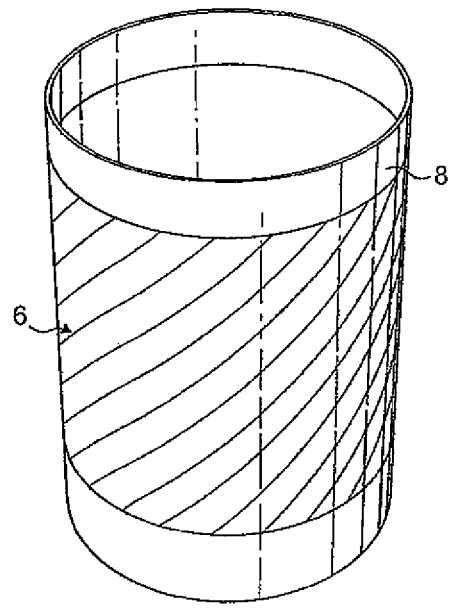

Referring to FIG. 1, a lightweight gas cylinder or pressure vessel comprises an inner liner 2 wrapped or otherwise reinforced with suitable fibres 4, for example, carbon fibres or fibres of a suitable synthetic material. The liner 2 is typically formed of a suitable steel. The liner 2 is enclosed within an outer plastics shell 6 comprising a bucket 8 and a lid 10. The liner 2 is of generally cylindrical shape and is symmetrical about its longitudinal axis. It has a mouth 12 which is typically formed with internal screw threads (not shown) that engage a cylinder valve 14 of a kind having a handwheel 16. The mouth 12 may be provided by a sleeve which is welded to the walls of a complementary port at the top of the liner 2. The cylinder valve 14 has a body with external screw-threads complementary to those in the mouth 12 of the cylinder so as to enable a fluid-tight engagement to be made between the mouth 12 of the cylinder and the valve 14. In general, the pressure vessel may be of the same kind and be made in the same way as the pressure vessel that is the subject of U.S. Pat. No. 6,386,384.

Figure 2:
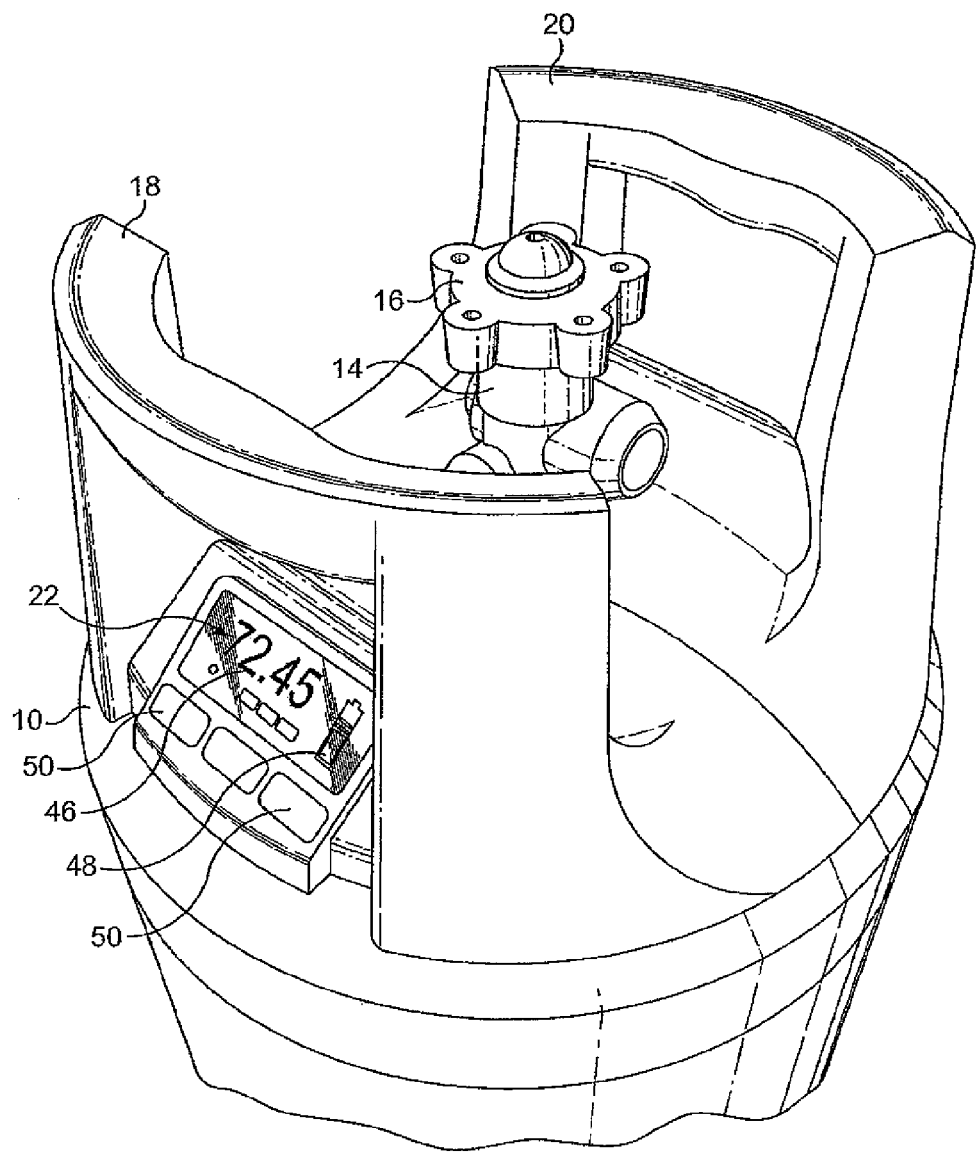
FIG. 2 is a schematic perspective view of a top portion of the vessel shown in FIG. 1.

As better shown in FIG. 2, the lid 10 of the shell 6 comprises handles 18 and 20 so as to facilitate manual lifting of the pressure vessel. The lid 10 is secured to the bucket 8 and houses a digital display screen device 22 underneath the handle 18. The handle 18 is still able to protect the screen 22 from accidental impacts from above. The display screen device 22 is operatively associated with an external pressure sensor device 24 and an external temperature sensor device 26, as is illustrated in FIG. 3.

Figure 3:
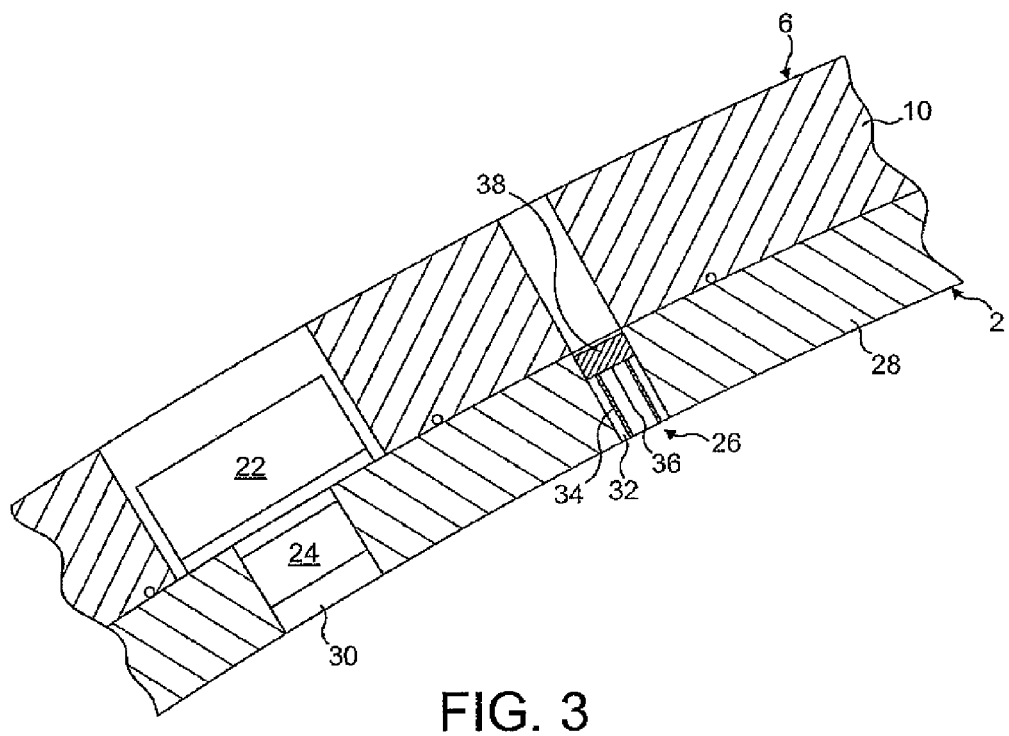
FIG. 3 is a schematic sectional elevation of part of a wall of the pressure vessel in FIG. 1 illustrating the pressure sensor and the temperature sensor of the apparatus according to the invention.

Referring now to FIG. 3, a shoulder position 28 of the liner 2 is formed with a first non-axial sensing port 30 therethrough. The sensing port 30 receives in fluid-tight engagement therewith the pressure sensor device 24. In an alternative arrangement (not shown) the port 30 is formed through the mouth 12 of the liner on the vessel side of the cylinder valve 14.

The pressure sensor device 24 is preferably of a kind based on the flexure of a ceramic membrane, for example, of aluminium oxide. This material has good elasticity and is almost free of hysteresis. The upper side of the membrane has a bridge arrangement (not shown) of electric resistors attached thereto. Flexure of the membrane in response to the pressure in the pressure vessel causes the resistors to be deformed with the result that their electrical resistivity varies. An input voltage is applied to the bridge and an output voltage dependent on the degree of flexure of the membrane and hence the pressure in the pressure vessel is tapped off from the bridge in a known manner. The output voltage is conducted to associated electrical circuits which amplify the voltage and provide a signal representative of the pressure to the display screen device 22. The pressure sensor device 24 is generally similar to that disclosed in U.S. Pat. No. 6,978,678 to which document the reader is referred for further information.

Referring again to FIG. 3, the shoulder portion 28 of the liner 2 also has a second non-axial sensing port 32 therethrough. The sensing port 32 receives the temperature sensor device 26 in fluid-tight engagement therewith. The temperature sensor device 26 may include a sleeve 34 containing a thermocouple 36. The sleeve 34 may depend from a plug 38 which engages the port 32. The thermocouple leads may extend through the plug 38 to associated electrical circuits (not shown) at the proximal end of the plug which amplify the electrical signal generated by the thermocouple 36 the size of which electrical signal is dependent upon the gas temperature within the pressure vessel. Electrical leads (not shown) from the plug 38 may extend between the liner 2 and the lid 10 of the shell 6.

In an alternative arrangement (not shown) to that shown in FIG. 3, the second port 32 may be formed not adjacent to the first port 30 but instead in the opposite shoulder of the liner 2. In this case, electrical leads from the temperature sensor device 26 to the display screen device 22 may be housed between the liner 2 and the lid 10 of the shell 6.

If the gas is a permanent gas, the mass of the gas can be calculated from a knowledge of the sensed pressure, sensed temperature, the volume of the pressure vessel, and the composition of the gas with which the cylinder or pressure vessel is filled. If the gas is not a permanent gas, however, and if the part of the gas is present in the pressure vessel in the liquid phase, then performance of such a calculation requires a knowledge of the volume of liquid present. In such an example, the temperature sensor device 26 may also incorporate a level sensor or level sensors (not shown). Thus, the plug 38 may receive leads from a thermistor (not shown) which is used to sense the level of the liquid in the cylinder or pressure vessel. Alternative level sensing devices can be used, for example, one emphasizing sonic sensing of the liquid level.

The display screen device 22 includes a programmable computing device 40 for calculating the mass of gas in the pressure vessel from the sensed pressure and temperature signals (and, as appropriate, the liquid level) and for feeding signals representing the results of the calculations to the screen 42 of the screen device 22. The screen 42 typically utilises light emitting diodes (LEDs) and/or a Liquid Crystal Display (not shown). The display screen device 22 may also house a battery (not shown) for activating the display screen 42. The battery may be disposable or rechargeable and may also be used to provide electrical power to the sensors.

The computing device 40 may also calculate parameters relating to the mass of gas in the cylinder or pressure vessel. For example, the device 40 may be programmed with the mass of gas present when the cylinder was full, and calculate how full the cylinder is at any time, for example, on a scale of 0-100, 0 being empty and 100 being full. This information can be displayed numerically as a percentage as indicated by the reference numeral 46 in FIG. 2 or pictorially as indicated by the reference numeral 48. Other calculations may be made. For example, if the gas is intended for use as a shielding gas in electric arc welding, then there may be calculated and displayed the length of time for which gas can be drawn from the cylinder before it runs out. In another example, if the gas is intended for use in filling balloons, the mass of gas present in the cylinder at any one time may be expressed in terms of the number of balloons that can be filled before the cylinder runs out of gas.

The display screen 42 may be permanently illuminated or may be provided with control buttons 50 such that a particular parameter or parameters will be displayed only when the buttons 50 are depressed.

Figure 4:
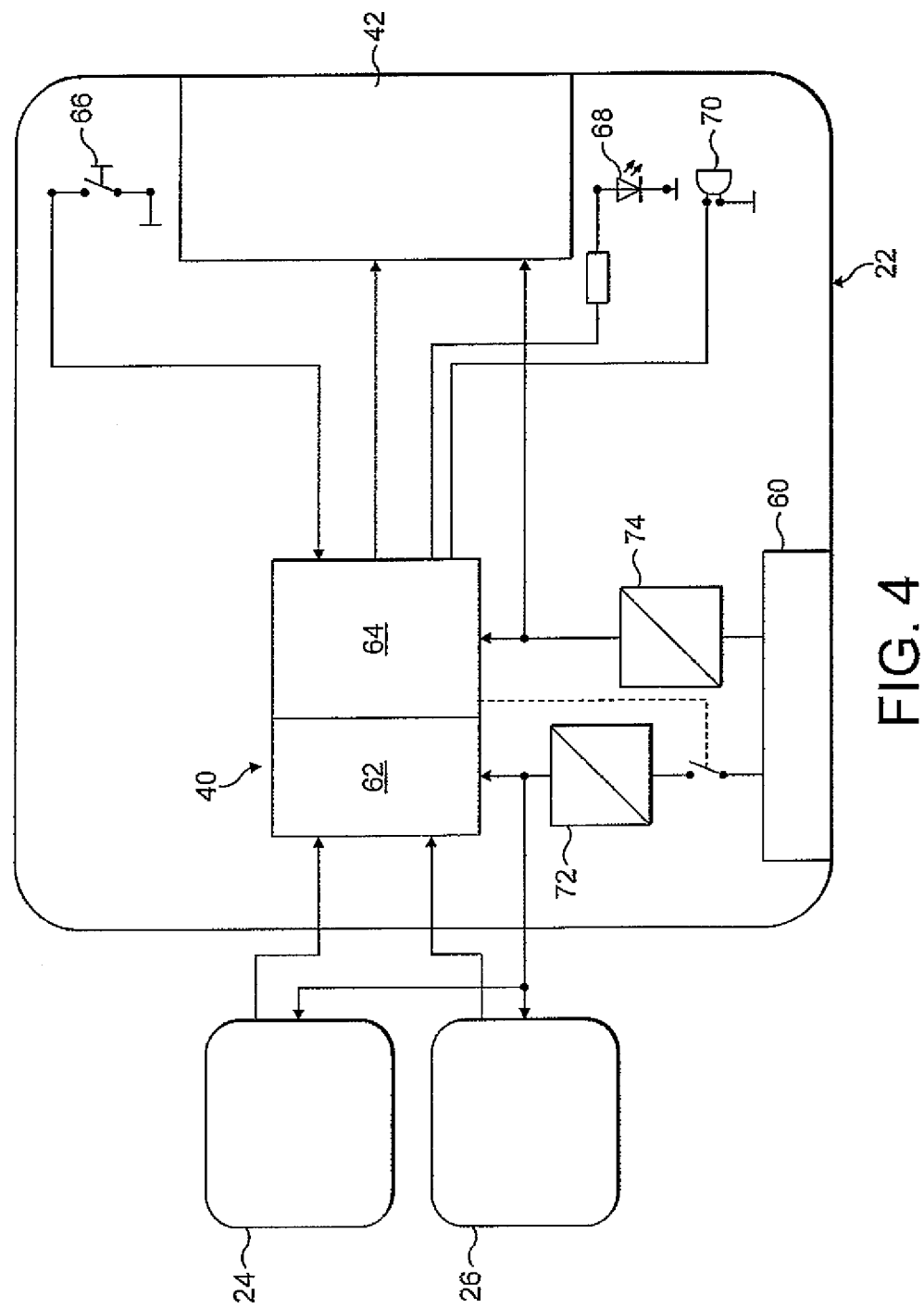
FIG. 4 is a schematic diagram illustrating the electrical components included in the vessel of FIG. 1.

The electrical arrangements are illustrated schematically in FIG. 4. All requirements for electrical power are met from a rechargeable or disposable electrical DC battery 60. The battery supplies the electrical power necessary to operate the pressure sensor device 24 and the temperature sensor device 26. The battery 60 also provides the necessary electrical power to operate the display screen device 22. The display screen device 22 includes an analogue to digital converter circuit 62 which converts signals from the sensors 24 to 26 into digital form. The converter circuit 62 is operatively associated with a programmable microprocessor 64 including a RAM (Random Access Memory) device (not shown) and interposes with an input keyboard 66 and output devices including a liquid crystal display screen 42, a Light Emitting Diode display 68 for providing a visual alarm signal and a buzzer 70 for making an audible alarm signal. The voltage provided by the battery 60 may be transformed into a first larger DC voltage by transformer 72 so as to provide electrical power to the sensors 24 and 26 and the analogue-to-digital converter 62, and to a second larger DC voltage by transformer 74 so as to provide electrical power to the microprocessor 64 and the output devices.

The pressure vessel apparatus according to the invention is thus able to give the user of a cylinder a visual indication of its contents, that is how full it is, on demand at any time.

Various changes and alterations may be made to the apparatus shown in the drawings. For example, it is not necessary to locate the sensing ports in the shoulder of the pressure vessel. An alternative is to provide a shut off valve assembly (or main cylinder valve) which includes the sensing port or ports on the pressure side of the main cylinder valve. The display screen device may also be incorporated in the valve assembly or in any guard for the valve, or may still be positioned on the lid 10 of the shell 6.

The invention claimed is:

1. A pressure vessel apparatus for storage of compressed gas, comprising:
    (a) a pressure vessel for containing the compressed gas, the pressure vessel including an outer plastic shell, said outer plastic she comprising a recess therein and a pair of integral handles;
    (b) an inner liner of material selected from the group consisting of fibre-reinforced liner and fibre-wrapped liner encased by the outer plastic shell;
    (c) a shut-off valve in engagement with a mouth of the pressure vessel;
    (d) an external pressure sensor device for sensing pressure of a gas in the pressure vessel, the external pressure sensor device being in continuous communication with an interior of the pressure vessel and being adapted to generate a first signal which is a function of the pressure sensed in the pressure vessel;
    (e) a temperature sensor device for sensing temperature of the gas in the pressure vessel, the temperature sensor device being in thermal communication with the interior of the pressure vessel and being adapted to generate a second signal which is a function of the temperature sensed of the gas;
    (f) a programmable computing device for calculating information about the gas in the pressure vessel from the first and second signals; and
    (g) a display screen operatively associated with the programmable computing device and disposed in the recess under a handle of the pair of handles for being protected and displaying said information.

2. The pressure vessel apparatus according to claim 1, wherein the programmable computing device is programmable to calculate a mass of the gas in the pressure vessel.

3. The pressure vessel apparatus according to claim 2, wherein the programmable computing device is able to compare a calculated mass of the gas with that in the pressure vessel when full.

4. The pressure vessel apparatus according to claim 3, wherein the display screen is able to display a comparison between a calculated mass of the gas with that in the pressure vessel when full in a medium selected from the group consisting of a pictorially, graphically, and digitally rendered display.

5. The pressure vessel apparatus according to claim 1, wherein the compressed gas is a permanent gas.

6. The pressure vessel apparatus according to claim 1, wherein the compressed gas is not permanent and a liquid phase is present in the pressure vessel, the apparatus further comprising a level detector for detecting a level of the liquid phase in the pressure vessel, the level detector adapted to generate a third signal which is a function of the level of the liquid phase sensed and to transmit the third signal to the programmable computing device.

7. The pressure vessel apparatus according to claim 1, wherein the external pressure and the temperature sensor devices are located within at least one corresponding sensing port in a shoulder of the pressure vessel.

8. The pressure vessel apparatus according to claim 1, wherein the external pressure and the temperature sensor devices are located within at least one corresponding sensing port in the shut off valve on a pressure side of the pressure vessel.

\* \* \* \* \*